No. 859,088. PATENTED JULY 2, 1907.
T. G. E. LINDMARK.
STEAM METER.
APPLICATION FILED JAN. 17, 1906.
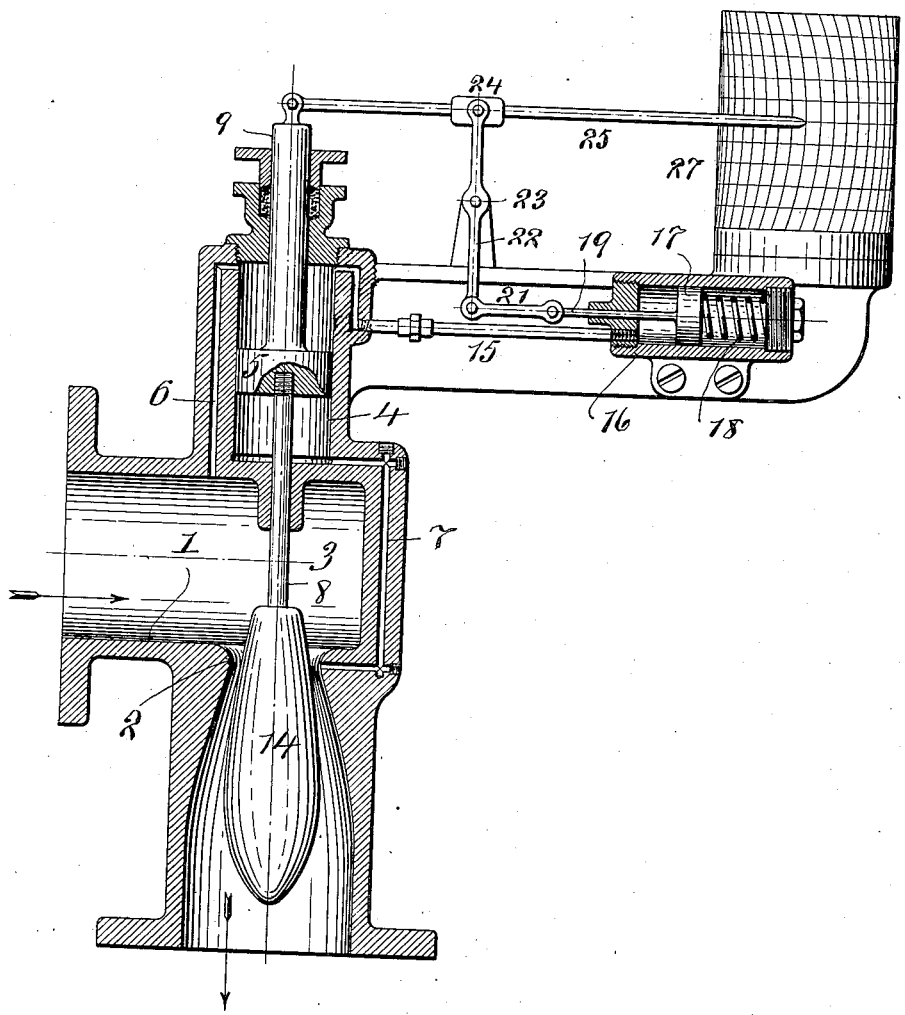
WITNESSES:
INVENTOR
Tore G. E. Lindmark
BY
his ATTORNEY

UNITED STATES PATENT OFFICE.

TORE GUSTAF EMANUEL LINDMARK, OF STOCKHOLM, SWEDEN.

STEAM-METER.

No. 859,088.      Specification of Letters Patent.      Patented July 2, 1907.

Application filed January 17, 1906. Serial No. 296,509.

*To all whom it may concern:*

Be it known that I, TORE GUSTAF EMANUEL LINDMARK, a subject of the King of Sweden, of Stockholm, Sweden, have invented a new and useful Improvement in Steam-Meters, of which the following is a specification.

The principle of the invention is as follows: When a fluid passes through a pipe having a constriction, the quantity of fluid passing per unit of time is a function. First, of the initial fluid pressure in the pipe before the constriction is reached, second, of the area of the constriction, and third, of the difference in the pressure existing in the pipe respectively at the constriction and in advance of it. If this difference of pressure by any suitable means is maintained constant, then the quantity of fluid passing per unit of time will depend upon the other two functions, and as a consequence said quantity may be directly measured by an apparatus controlled by variations in said functions.

The present invention is a steam meter constructed and operating in accordance with the aforesaid principle.

The accompanying drawing represents the apparatus.

1 is a pipe through which the steam passes in the direction of the arrow, having a constriction at 2, and successively increasing areas from this constriction in the direction of the flow. The steam pressure in said constriction will be less than in the portion 3 of the pipe in advance thereof.

4 is a cylinder having a piston 5, and connected by a pipe 6 on one side of said piston to the portion 3 of pipe 1, and by pipe 7 on the other side of said piston to the constriction 2 of pipe 1. Inasmuch as the pressures are different in pipes 6, 7 a free piston in the cylinder 4, would normally be driven by the unbalanced pressure to one end or the other of said cylinder. But having chosen a pressure difference to maintain constant, I arrange the piston so that it will remain in equilibrium and motionless in the cylinder despite this difference. This I may do by counterbalancing the pressure difference acting on one side of the piston by any suitable force acting on the other—or, as here shown, by making the area of one side of the piston less than the area of the other side, so that the greater pressure in pipe 6 acting on the side of smaller area, will counterbalance the smaller pressure in pipe 7, acting on the larger area.

A stem 8 secured to the piston carries a tapered plunger 14 which enters the passage formed by the constriction 2. Hence the movement of piston 5 in cylinder 4 causes plunger 14 to travel in one direction or the other to increase or diminish the annular area of the passage formed between said plunger and the conduit.

Communicating with the piston 3 of pipe 1 by pipe 6, cylinder 4 and pipe 15 is a cylinder 16 containing a piston 17 and abutting against piston and cylinder head is a helical spring 18. The piston rod 19 connects by link 21 with one end of a lever 22 pivoted at 23. The other end of said lever is pivoted to the sliding fulcrum 24 of a lever 25, one end of which is connected to the end of piston rod 9 which extends through a stuffing box in the head of cylinder 4. The free end of lever 25 carries a marking point which bears on the scale cylinder 27. Said cylinder may be rotated at a definite speed by any suitable clock mechanism, and is provided with a scale indicating steam quantity.

The operation of the device is as follows:—An arbitrarily chosen difference in pressure in the pipes 6 and 7 is taken as a constant. The spring 18 in cylinder 16 is adjusted to counterbalance the pressure in pipe 6. So long as these conditions continue the pistons in said cylinders will remain at rest. If the pressure in pipe 7 falls the piston in cylinder 4 moves downward and causes the plunger 14 to increase the annular area of the passage at constriction 2. If on the other hand, the pressure in pipe 7 increases, the piston in cylinder 4 rises and the plunger 14 is moved in the opposite direction to reduce said annular area. This change in the annular area of the passage in turn varies the steam pressure in pipe 7, until the originally chosen constant difference of pressure is re-established in cylinder 4, when the piston therein again comes to rest. As the quantity of steam passing through pipe 1 is also a function of the initial pressure in portion 3 of said pipe, it is necessary to compensate directly for fluctuations in said pressure. This is effected through the piston 17 in cylinder 16. If the pressure in pipe 6 rises, said piston 17 moves against its counterbalancing spring 18 with the result that the fulcrum 24 of lever 25 is moved to the left of the drawing, and the length of the lever arm between said fulcrum and the marking point is increased. If on the other hand the pressure in pipe 6 falls, the length of the lever arm in like manner is decreased. Hence the extent of, movement of the marking point indicating unit steam quantity passing through pipe 1, is varied correspondingly to variations in the initial steam pressure. Hence also the movement of the marking point on its scale is controlled by both functions of the quantity of fluid passing per unit of time and by nothing else. That is to say it is controlled by the initial fluid pressure in portion 3 of pipe 1 (or, in other words, the pressure in pipe 6), and, by variations in the annular area of the passage at the constriction 2, the difference in pressure existing in the pipe respectively at the constriction 2 and in the part 3 in advance of that constriction (or in other words in pipes 6 and 7) being automatically maintained constant, by the movement of plunger 14 and consequent variations in the annular area of the passage at the constriction.

Owing to the successively increasing areas of pipe 1 from the constriction 2 the velocity which is imparted to the steam when passing said constriction, will be converted into pressure so that practically the same steam pressure is prevailing after the steam has passed the constriction as in chamber 3. The steam thus passes the steam meter practically without any loss of pressure. This fact is of value, when the steam meter is inserted in the steam conduit leading to a steam engine, as the steam will reach the engine without reduction of pressure.

I claim:

1. In a steam meter, a conduit diminishing to a constriction and then diverging therefrom, a tapered plunger disposed in said diverging conduit and entering said constriction and a mechanism for moving said plunger in the direction of its longitudinal axis said mechanism being controlled by differences of pressure in said conduit at and in advance of said constriction.

2. In a steam meter, a conduit having a constriction, a plunger controlling the area of the passage in said constriction, a mechanism for operating said plunger controlled by differences in pressure in said conduit at and in advance of said constriction, means for indicating steam quantity passing per unit of time controlled by said plunger operating mechanism and means coöperating with said plunger operating mechanism to control said indicating means.

3. In a steam meter, a conduit having a constriction, a plunger controlling the area of the passage in said constriction, a mechanism for operating said plunger controlled by differences in pressure in said conduit at and in advance of said constriction, a scale, a movable index coöperating with said scale, means for controlling said index by said differences in pressure and a mechanism controlled by pressure in said conduit in advance of said constriction, for varying the amplitude of movement of said index on said scale corresponding to unit change in said pressure.

4. In a steam meter, a conduit having a constriction, a plunger controlling the area of the passage in said constriction, a cylinder, a piston therein, ducts connecting said cylinder on opposite sides of said piston with openings in said conduit respectively located at and in advance of said constriction, and means for transmitting motion from said piston to said plunger.

5. In a steam meter, a conduit gradually decreasing in diameter to a constriction and then gradually increasing in diameter to normal dimension, an elongated tapering plunger controlling the area of the passage in said constriction and in said gradually increasing portion of said conduit, and a mechanism for operating said plunger controlled by differences in pressure in said conduit at and in advance of said constriction; the gradually increasing portion of said conduit being longer than the gradually decreasing portion.

In testimony whereof I have signed my name to this specification in the presence of two subscribing witnesses.

TORE GUSTAF EMANUEL LINDMARK.

Witnesses:
 WALDEMAR BOMAN,
 T. EKSBOHM.